(12) United States Patent
Battisti

(10) Patent No.: US 6,682,022 B2
(45) Date of Patent: Jan. 27, 2004

(54) BOUNDARY LAYER CONTROL OF AERODYNAMIC AIRFOILS

(76) Inventor: Lorenzo Battisti, Via del Suffragio 28, 38100 Trento (TN) (IT)

( * ) Notice: Subject to any disclaimer, the term of this patent is extended or adjusted under 35 U.S.C. 154(b) by 0 days.

(21) Appl. No.: 10/286,865

(22) Filed: Nov. 4, 2002

(65) Prior Publication Data

US 2003/0085324 A1 May 8, 2003

Related U.S. Application Data

(63) Continuation of application No. 09/718,397, filed on Nov. 24, 2000, now Pat. No. 6,488,238.

(30) Foreign Application Priority Data

Nov. 24, 1999 (GB) .............................................. 9927807

(51) Int. Cl.⁷ .............................................. B64C 21/04
(52) U.S. Cl. ..................... 244/207; 244/204; 244/130
(58) Field of Search ................. 244/130, 200, 244/204, 207, 208, 209; 205/75, 67; 416/231 R

(56) References Cited

U.S. PATENT DOCUMENTS

| | | | | |
|---|---|---|---|---|
| 3,778,188 A | * | 12/1973 | Aspinwall | 416/97 R |
| 3,950,114 A | * | 4/1976 | Helms | 416/97 A |
| 4,575,406 A | * | 3/1986 | Slafer | 210/500.25 |
| 4,714,424 A | * | 12/1987 | Kinugasa et al. | 425/388 |
| 5,039,389 A | * | 8/1991 | McMichael | 204/282 |
| 5,728,284 A | * | 3/1998 | Oyama | 205/70 |
| 2002/0133132 A1 | * | 9/2002 | Copat et al. | 604/383 |
| 2002/0157956 A1 | * | 10/2002 | Ikeda | 205/75 |

FOREIGN PATENT DOCUMENTS

| | | | | |
|---|---|---|---|---|
| EP | 532093 A1 | * | 3/1993 | B64C/21/06 |
| GB | 687723 | | 2/1953 | |
| GB | 687724 | | 2/1953 | |

OTHER PUBLICATIONS

Flight International, May 15, 1982 p. 1208, Laminar Flow a reality.*

* cited by examiner

Primary Examiner—Peter M. Poon
Assistant Examiner—T. D. Collins
(74) Attorney, Agent, or Firm—Dykema Gossett PLLC

(57) ABSTRACT

Boundary layer control of a structural element in fluid stream is achieved by the following operations:
  providing in such structural element at least one region equipped with micro porous structure by an electroforming technique;
  having a fluid stream flow through the external surface of the at least one region, inwards or outwards with respect to the environment in which that element is placed.

29 Claims, 4 Drawing Sheets

BOUNDARY LAYER CONTROL OF AERODYNAMIC AIRFOILS

CROSS-REFERENCE TO RELATED APPLICATIONS

This is a continuation of application Ser. No. 09/718,397, filed Nov. 24, 2000, now U.S. Pat. No. 6,488,238, which claimed priority of U.K. Application No. 9927807.9, filed Nov. 24, 1999. All priorities are requested.

BACKGROUND OF THE INVENTION

The present invention relates in general to aerodynamic and thermal wall boundary layer control of aerodynamic airfoils, in particular to application of such to aircraft, turbo engines and automotive components, especially, but not exclusively, to isolated airfoils or fuselage parts, wings, flaps and blades, casing, end walls and liners of turbo engines in order to increase the efficiency and to improve off design performance.

As well known, a boundary layer develops on a wall of a body as soon as it interacts with a flow stream. The aerodynamic performance (lift or loading and drag) and the thermal performance (heat exchange efficiency and working temperature of the component) on nominal and off design conditions depend on the properties and the structure of the boundary layer.

The purpose of the boundary layer control, also known as BLC (Boundary Layer Control), is to affect the flow by influencing the structure of the boundary layer, in order to increase the efficiency, the loading and the stage pressure ratio of turbo engines and off design performance of isolated airfoils and bodies.

The main advantages of boundary layer control are:
  to delay transition from a laminar to a turbulent boundary layer and thus reduce skin friction and heat transfer;
  to prevent or delay boundary layer separation and thereby increase the allowable blade or airfoil loading and range of angles of attack;
  to cancel or attenuate flow disturbances in transonic flows.

Such effects can be achieved either by suction of the boundary layer in the regions of interest, or by injection of a working fluid which in turn can be either the same as the main flow or a different one (binary boundary layer).

Boundary layer control by means of a suction method appears, in general, to be the more efficient, but the injection method would be necessary for its use in conjunction with air cooling of turbine blades.

Concerning aircraft or automotive applications, the suction area may be applied either at wing leading edges or at the forward edge of the trailing edge flaps.

Concerning turbo engines, as in the case of isolated airfoils, it is possible to increase the blade loading considerably by the use of boundary layer control. This increase is achieved by prevention or delay of flow separation and the resultant stalling of the blades, and the greatest gain can be obtained if the blades are specially designed for the use of the boundary layer control so as to maintain high loading over most of the blade section. By use of boundary layer control a higher blade loading can be obtained for a given inlet Mach number without exceeding a given Mach number on the blade. In fact the blade can be designed to have a uniformly high Mach number over a larger portion of the upper surface of the blade without flow separation. For the same reason, higher inlet Mach numbers can be used with a given loading without exceeding a given Mach number on the blade. The gain resulting from maintaining a high velocity over a larger portion of the upper surface may be materially reduced, however, by increased velocity over the lower surface as a result of the practical requirement of thicker blades for boundary layer control.

With a conventional blading, the maximum pressure ratio per stage in a multistage compressor is obtained by increasing the axial velocity component and maintaining an essentially symmetrical velocity diagram throughout in order to assure the maximum allowable Mach number on all blade elements. This increase in the axial velocity component can only be obtained by using a sufficiently large taper for the annular passage to more than compensate for the reduction in axial velocity due to the increase in density. The use of taper large enough to maintain constant relative Mach numbers, however, leads to very small passages in the later stages of high pressure-ratio compressors and to high exit velocities. The resultant narrow annular passage tends to produce low efficiencies in the later stages and the high exit velocities either produce large exit losses or require long diffusers. For these reasons, most commercial compressors use much less taper than required to produce constant Mach number and consequently obtain relatively low Mach numbers and pressure ratios in the later stages.

The drop-off in pressure ratio in the later stages due to this decrease in relative Mach number in the wider passage could be prevented, however, if the blade loading could be increased in these stages. Because of the lower Mach numbers, it should be possible to use considerably higher blade loading without obtaining excessive local Mach numbers on the blades. With conventional blading, however the blade loading is limited by the early stalling of the blades.

The situation can be somewhat improved by the use of blades of high camber, but the gain is limited and the useful range of angles of attack may be reduced. Some further slight increase in pressure ratio can be obtained by the use of solidities higher than conventional limits of about 1.2, but the gain is generally obtained with some drop in efficiency.

A definitely greater increase in loading and stage pressure ratio should be possible through the use of boundary-layer control on the rotor, stator blades and hub and tip endwalls. The results from isolated airfoils indicate that there should be no difficulty in doubling the loading obtainable without boundary-layer control with a corresponding increase in pressure ratio. The effect of boundary-layer control on the stage efficiency is less easy to evaluate than its effect on stage pressure ratio.

The profile drag-lift ratio should be decreased because of the large increase in lift coefficient possible without boundary-layer separation and because of the decreased profile drag resulting from reduced boundary-layer thickness behind the control slot or porous structure. In addition, some improvement in efficiency might be expected from the fact that, for a given drag-lift ratio, the velocity diagram theoretically most favorable to high profile efficiency (symmetrical diagram with axial velocity equal to one-half rotor-blade velocity), can be approached more closely throughout a multistage compressor when a high stage pressure ratio is obtained by use of boundary-layer control on both rotor and stator blades. The effect is generally obtained with conventional blades by varying the axial velocity to give a constant Mach number entering all blade rows.

The boundary-layer control when applied at critical points of the blades and the casing, allows for positively action on the secondary-flow losses leading to a consistent reduction of the overall losses of the stages.

In addition to the effect on internal aerodynamic efficiency, the power required for supplying the boundary-layer-control air must be considered in evaluating the overall efficiency of the machine. Because of this pumping loss, it appears desirable to limit the boundary-layer control to the later stages where the largest gains are possible.

In relation to the turbine blade performance, the boundary layer control appears to have useful applications in conjunction with turbine blade cooling.

One of the most effective methods of cooling the trailing edge region of turbine blades is by ejecting cooling air at or near the trailing edge of the blade. This ejected air can be used at the same time as an effective method of boundary layer control for increasing the blade loading and thereby reducing the total blade area for a given power output. The reduction in blade surface may, in turn, be expected to reduce the amount of cooling required to maintain a given blade temperature.

A further application of the BLC has been made for turbines requiring very high specific work with limited rotor blade speed, where negative reaction may be required. The flow through the turbine rotor is then similar to that through a typical compressor rotor and, if the blade loading is to be high, boundary layer control may be required to prevent stalling of the blade. In this case, as in the more usual case, boundary layer control by injection can effectively be used in conjunction with blade cooling.

BLC may well be applied to advantage to fluid dynamic behaviour on the end walls and the casing of the turbo engine and could be successfully used when such extracted working fluid is in turn routed to cooling systems.

The purpose of the present invention is to define a method of BLC capable of limiting the flow rate fraction used to obtain such an interaction with the wall boundary layer of the component at its maximum extent, while avoiding negative effects on the thermo-mechanical strength and other technological constraints.

According to the present invention, there is provided a method of boundary layer control of a structural element in a fluid stream which includes the following operations:

providing in such structural element at least one region equipped with a microporous structure by an electroforming technique;

having a fluid stream flow through the external surface of the at least one region, inwards or outwards with respect to the environment in which that element is placed.

The structural element is given an intrinsic BLC function by means of a structural porous matrix which carries out the suction or effusion of fluids. In general, this intrinsic function can be obtained by equipping the structural element (airfoil, wing, blade, casing, etc.) with a carrying structure or, alternately with a lining consisting of one or more inserts with micro-holes obtained by means of an electroforming technique.

In addition suction or injection by means of porous walls may be used in transonic flows for the purpose of canceling or attenuating flow disturbances that ordinarily reflect from solid boundaries. With a porous wall, a selected amount of suction can produce cancellation over a range of incident waves and Mach numbers which otherwise would result in reflections. Again, the use of porous material, for a given aerodynamic performance, allows one to limit appreciably the fluid mass flows being supplied.

In practice the invention makes available a BLC method for a structural element, for instance a wing airfoil, which makes use of a microporous structure that, because of the very high density of the micropores, determines a fluid dynamic behaviour of the material which is close to that of a transpiration (sweating) wall.

The fabrication procedure to be used is based on a controlled electrolytic deposition method and is considerably simpler than the traditional fabrication methods (melting, moulding, machine tool processing) for known perforated structures; from the technological point of view, moreover, it makes possible solutions that cannot be obtained by means of these state-of-the-art techniques, a case in point being the possibility of extracting air from the surface of a body in a continuous manner over an extended surface portion.

Even though other and less conventional fabrication techniques employed in this and related sectors for the production of perforated elements intended for boundary layer control functions, including—among others—the use of electrically welded or sintered grids or holed plates, make it possible to obtain better results in terms of thermal performance and enhanced resistance to oxidation and corrosion phenomena, they have brought to the fore problems deriving from the clogging of the holes associated with the use of dirty fuels or unfiltered working fluids. A not by any means negligible contribution to this clogging phenomenon is caused by the very rough surface of the perforated elements fabricated in such manner.

The present invention is deemed to be capable of appreciably increasing the performance limits typical of the aforesaid known solutions, first and foremost thanks to the extreme lightness that can be obtained due to the very high surface density of the microholes, secondly thanks to the surface roughness of the material, which micrometer measurements show to be greatly reduced, and finally because the fabrication technique allows for control of the sucked or withdrawn quantities of fluid by locally adjusting the permeability of the wall.

The permeability is a fabrication parameter which can be locally managed through the density of the holes, their diameter and the thickness of the wall. In the specific case of turbo engine blades, this effect may be obtained on either rotor blades or vanes and generally on platforms, end walls and casing.

Basically the principal advantages obtainable by means of the BLC method subject of the invention can be summarized as follows:

the use of a highly porous material leads to a considerable reduction in weight of the component which is employed, thereby reducing stresses;

the use of a highly porous material, as far as the boundary layer control is concerned leads to a considerable increase in the aerodynamic performance of the component;

in a multistage compressor, the number of stages necessary to obtain a given pressure ratio is considerably reduced, thereby dramatically reducing the weight and the length of travel through the machine;

the turbo engine or aircraft/automotive component made of electroformed porous material makes available self carrying structures equipped with the desired location, extent and permeability of effusing regions.

the provision of a porous wall, rather than slits, allow continuous suction or injection to be performed over a large part of the component, leading to a much more effective boundary layer control, and avoiding the jet effect of the usual perforated structures;

the permeability of the wall, required to obtain a desired suction or ejecting effect, can be adjusted according to the design tasks;

the air consumption becomes quite low, thus reducing the work of the supplying compressor;

component boundary layer control can be very readily obtained even in zones that have always been associated with difficulties of a technological nature during manufacture and machining;

in the case of injection, the surface and the body of the component are maintained below the limiting temperatures for viscous flow that lead to a drastic reduction of the strength and structural integrity characteristics;

in case of injection, the solid and liquid particulate matter present in the working fluid is deflected more efficaciously by the surface air film, thus forestalling such phenomena as erosion, deposition and sulphur attack on of the surface;

in the case of injection the surface temperature of the component is lowered below the threshold of hot corrosion and surface oxidation is controlled to within acceptable limits.

BREIF DESCRIPTION OF THE DRAWINGS

For a better understanding of the invention, and to show how the same may be carried into effect, reference will now be made, by way of example, to the accompanying drawings in which.

DETAILED DESCRIPTION OF THE DRAWINGS

Figure 1:
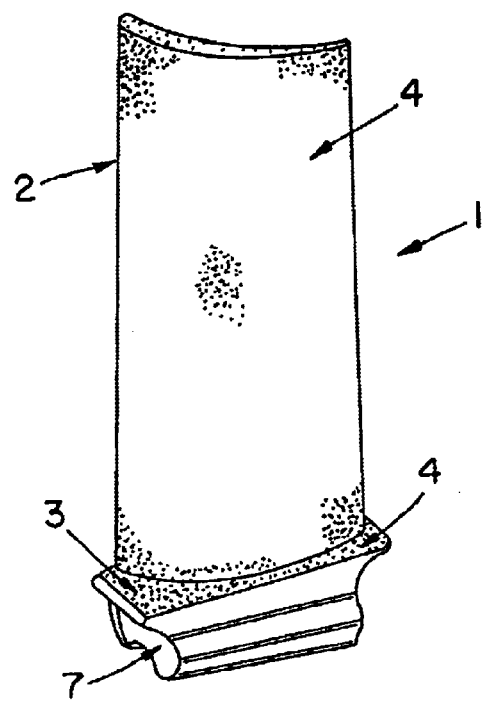
FIG. 1 shows a schematic perspective view of a blade element in accordance with a first embodiment of the invention.

Reference number 1 in FIG. 1 generically indicates a blade element capable of being used—for example—in the stator or a rotor of a gas turbine compressor. The blade element 1 consist in the usual manner of a foil or blade body 2 with a platform 3 for attaching it to a root part 7.

The entire blade body 2, viz. the entire wall that defines its aerodynamic profile, is constituted by a self-supporting structural shell formed by a porous element indicated by the reference number 4. The said porous element 4 could possibly also, as in the example illustrated by FIG. 1, be used for the formation of the platform 3. In that case the blade body 2 and the platform 3 may be constituted either by two separate pieces or by a single piece. The blade 2 and the platform 3, independently of whether they are to be made in separate pieces or in an unitary entire body, are obtained by an electrolytic electroforming technique. What has just been said applies also to the formation of the tip of the blade element (which is not shown on the drawing).

Figure 8:
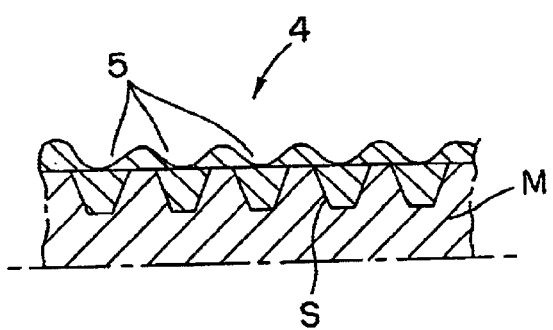
FIG. 8 shows, again to relatively large scale, a partial and schematic view of the section of a portion of the porous element used in the construction of the components of FIGS. 1 to 7.
Figure 9:
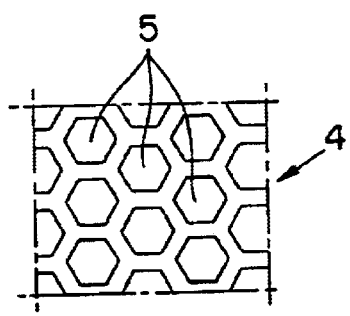
FIG. 9 shows a fragmentary plan view as seen from above of FIG. 8.

The porous element 4 is illustrated in greater detail in FIGS. 8 and 9. It has a micro-perforated laminar structure, where openings, indicated by the reference number 5, have a shape in the surface plane (or transverse section) that may be —for example —either polygonal, normally hexagonal, or rhomboidal, the walls of the openings having rounded surfaces and tapering from the outer face of the lamina towards the inner face. More generally, the holes 5 may have a form that simply converges or simply diverges from the outer face to the inner face of the lamina and may also be of a converging-diverging form. The holes 5 may have diameters that, depending on the length of time in the electrolysis bath and the desired thickness of the laminate, will normally be less than 300 microns, for example, from 60 to 3–4 microns. These diameter sizes may be either homogeneous or differ from one region to another, in accordance with appropriate optimization criteria. In general, the density of the holes 5 may be, for example, between 10 holes/mm and 2 holes/mm, while the thickness of the lamina may be of the order of from 80 microns to 500 microns.

According to the invention, the micro-perforated lamina is produced by means of a controlled electrolytic electroforming process, with selective deposition of nickel on a matrix arranged as the cathode, appropriately prepared for surface conditioning of the lamina. In particular, the matrix, generically indicate by the letter M, has a hollow imprint sometimes referred to as "inkpot", suitable for creating the conductive zones for the electroforming process and the zones rendered insulating, S, by filling with dielectric resins that constitute the electroformed holes eventually being leveled and chromeplated. In this way the nickel formed on the matrix M during the electrogalvanization process becomes deposited around the imprints S, thus forming the micro-holes 5. The surface of the lamina 4 realized in this manner has its outer surface, i.e., the surface that during the formation process is turned towards the matrix M, perfectly smooth and devoid of all roughness.

Although nickel (or its alloys) is considered as the preferred material, it is quite clear that the electrolytic deposition process for forming the lamina 4 can also make use of other metals and alloys, a case in point being cobalt-based alloys, and titanium.

Figure 2:
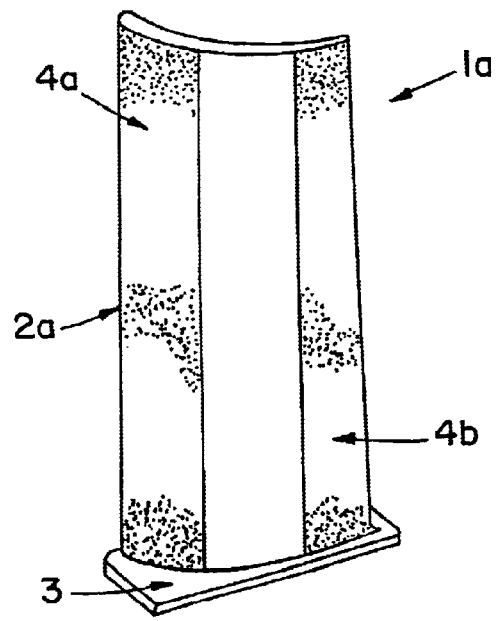
FIG. 2 shows a simplified view, similar to FIG. 1, which illustrates a second embodiment of the blade element.

In the case of the variant illustrated by FIG. 2, the blade element 1a represents the blade body 2a where the porous element is constituted by one or more inserts. In such embodiment, two inserts are shown to be adopted, indicated by the reference numbers 4a and 4b, situated respectively at the tip or leading edge 4a and the tail or trailing edge 4b of the blade, in this case indicate by 1a.

Figure 3:
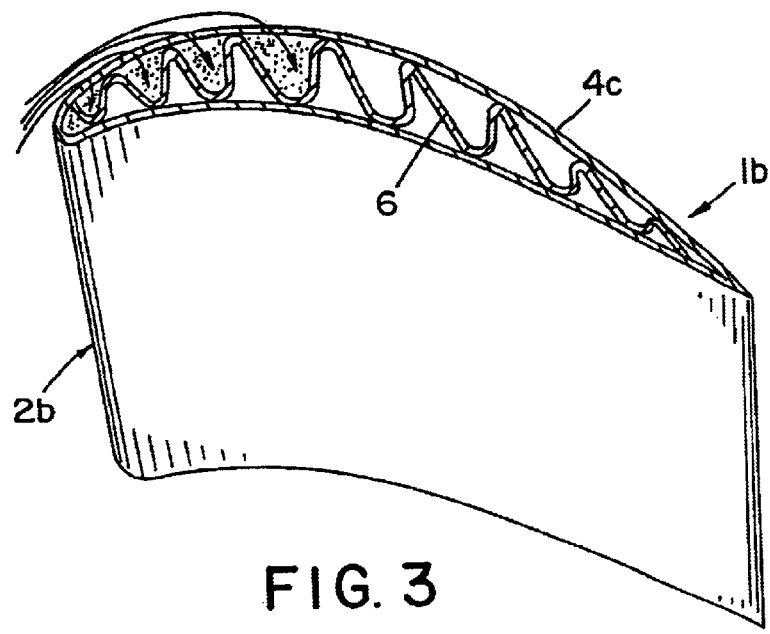
FIG. 3 shows a fragmentary view to a larger scale and illustrates a third embodiment of the blade element.

In the illustrated by FIG. 3, the blade element 1b constitutes the whole of the blade body 2b, consisting of a porous element 4c inserted and fixed on an internal supporting structure 6 that also has the function of appropriately channeling the suction or ejection air.

Alternatively, the internal supporting structure 6 need not perform any function perform other than the function of channeling the cooling air within the blade, and in this case the lining 4c will constitute a self-supporting structure as in the case of FIG. 1.

The suction or aspirating effect is obtained pneumatically by means of the different pressures of the environments which are separate from the porous wall. The static pressure along the pforile changes and, as consequence, in order to extract the amount of fluid necessary to affect the boundary limit, the generated pressure drop across the porous wall must change too. For assigned pressure conditions on the main flow-wall side, the pressure gradient across the porous wall can be modulated either by means of aspirating devices or by creating some connection between environments at different pressures. The pressure drop can be obtained by means of fluid lamination processes and/or using the particular fabrication characteristic of the porous wall which allows change to take place in the fundamental parameters for the fluid flow control, such parameters being the holes diameters, the superficial density, the wall thickness, and, additionally, the shape of each hole itself which, from the fluid dynamic point of view, behaves as a nozzle and can be, as consequence used as mass flow control device.

Figure 4:
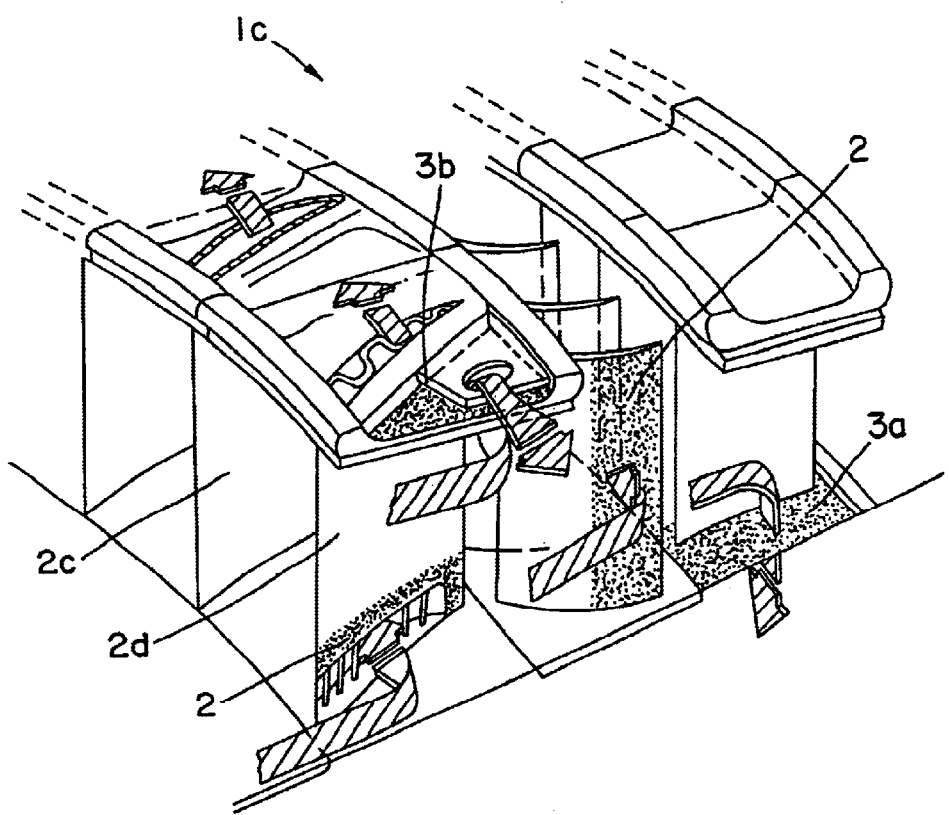
FIG. 4 shows an example of boundary layer control by means of air suction on rotors and the stators of a compressor where the advantages of using the electroformed porous elements are various.

In FIG. 4 an axial compressor stage (stator and rotor) 1c is shown. The stator of the preceding stage is, for the sake of clarity, also shown. FIG. 4 depicts several technical types of porous structure equipped component for BLC. The air is sucked from the porous element 2 either by stator means or rotor means or through the platform (or the end walls) of the foil which can either be integral with the blade body, in case 3a, or an insert, in case 3b. The above can be applied either to the rotor or stator blade. The blade element 2 can be either a self supporting shell having air self distributing function, in case 2c, or a liner applicable over an air internal channeling strut, in case 2d. Alternatively, the liner could be either supported from the internal strut or being self supporting and serving only an air channeling function to the insert.

The permeability of the porous wall can be changed from zero (no as passages there through obtained by means of an electroforming technique), to a locally desired porosity achieved through the fabrication process the matrix and the deposition steps.

Figure 5:
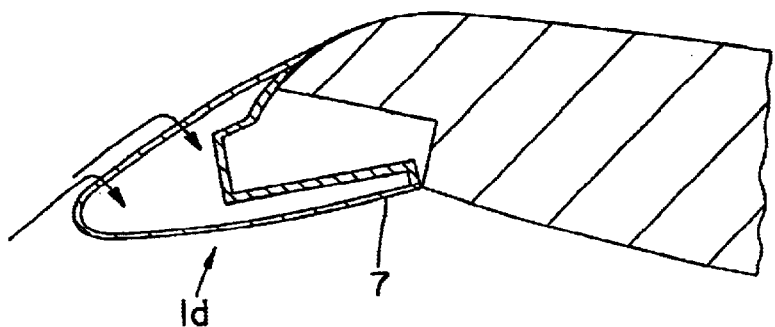
FIG. 5 shows a schematic cross section an aircraft wing leading edge equipped with a porous element used for air suction-injection.

FIG. 5 shows a schematic cross section through an aircraft wing leading edge flap 1d equipped with a porous element used for air suction-injection.

The porous structure can be either a self-supporting structural shell or formed from one or more separate liners inserted in the main structure.

Figure 6:
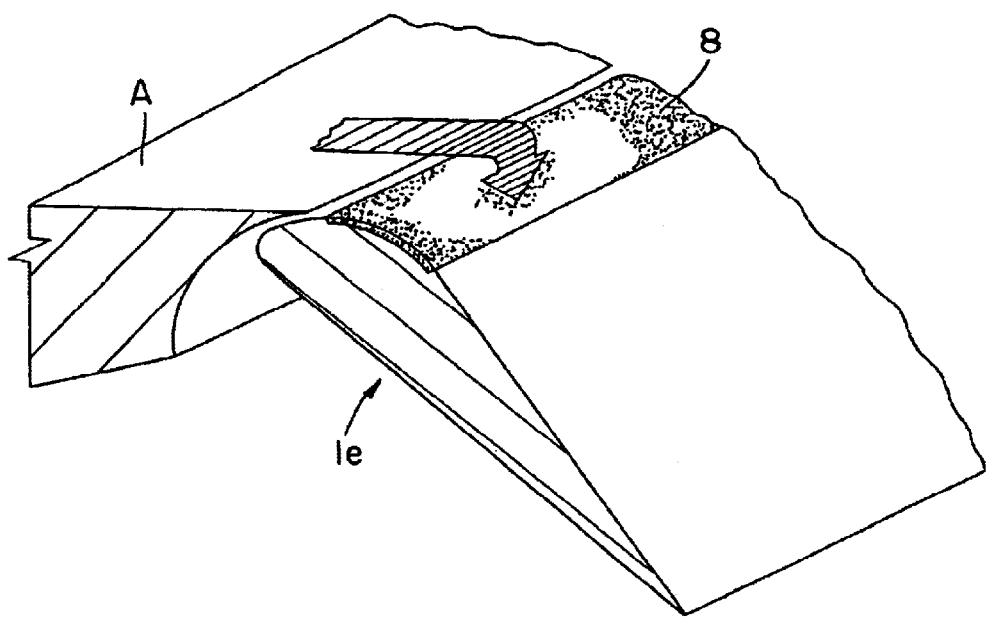
FIG. 6 shows a schematic perspective view of the same application as FIG. 5, but here related to an aircraft trailing edge flap.

FIG. 6 shows, like FIG. 5, an aircraft flap 1e, but this is applied to the wing trailing edge A equipped with a porous element 8, used for air suction-injection. The porous structure can be either a self-supporting structural shell or be constituted by one or more separate liners inserted in the main structure.

Figure 7:
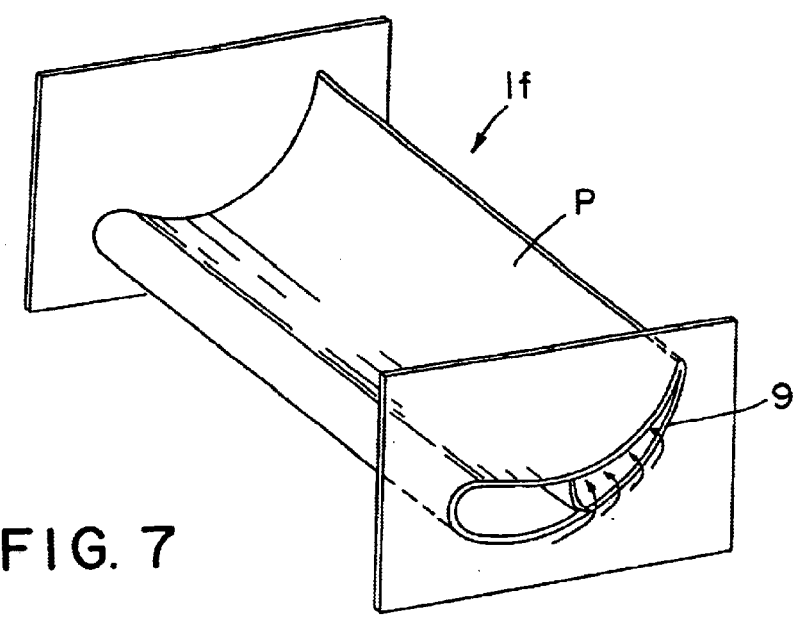
FIG. 7 shows a simplified sketch of an automotive rear wing assembly equipped with porous electroformed element.

FIG. 7 indicates generally an automotive rear wing assembly capable of being used—for example—to enhance the stability of a racing car. The air is deflected from wing P and then drawn through the wing suction side rear part and thus channeled away. The wing element 1f incorporates a porous element 9 which can assume the configurations indicated in the description of the element 2.

In the embodiments that have just been described, as also in all possible variants and solutions applying the invention, the micro-holes 5 of the porous element, for instance the element 4 shown in FIGS. 8 and 9, perform a primary function of boundary layer control by means of the suction (or injection) of air which passes into the interior of the body to which the porous element is applied or from which it is integrally formed. This assures the maximum efficiency of the boundary laeyr control, and avoids the problems of clogging of the micro-holes 5 even when dirty working fluids are being used, thanks to the smooth conformation of the external surface of the porous element, which is devoid of all roughness, and the flow conditions that prevail on this surface. To this one has to add the previously listed advantages in terms of structural weight reduction maintenance of resistance and structural integrity retention over a long time, as well as the technological simplicity of the production process.

It is worth noting that each structural component on which at least one porous element is present, can, alternatively, be produced integrally by means of porous structure obtained by an electroforming technique.

It should however be noted that, even though the invention has here been described with express reference to a blade element, it can be applied in an equally advantageous manner to other mechanical components, cases in point being every application where boundary layer control or the injection or extraction of the working fluid determine advantages for performance augmentation.

In particular, when applied to components to be employed in contact with working fluids, the porous element, which can always be used either as a self-supporting structure or in the form of inserts or linings, performs not only its intended boundary layer control function, but also—through its micro-holes 5—a useful and efficacious distributing function.

What is claimed is:

1. A method for achieving boundary layer control of a structural element in a fluid stream, wherein:

providing such structural element at least one region having a microporous structure produced by means of an electrolytic electroforming procedure in which there is deposition of a metal or metal alloy on a matrix arranged at the cathode and having a hollow imprint suitable for creating conductive areas separated by insulating areas by filling with dielectric resins that constitute the electroformed holes, the microporous structure having an external surface that is smooth and devoid of roughness and crossed by micro-holes in correspondence to the insulating areas of the matrix, and having a secondary fluid stream flowing through said at least one region towards or away from the external surface of the structural element in such a way to achieve a boundary layer control on said external surface thereof, said microporous structure produced by the means of an electrolytic electroforming procedure being directly fabricated from a single deposition procedure of said metal or metal alloy on said matrix arranged at the cathode.

2. Method according to claim 1, wherein the aforementioned fluid stream flows towards or out from said at least one region with a microporous structure to achieve different pressure conditions between the environments separated by said at least one region.

3. Method according to claim 2, wherein the said different pressures are obtained by means of lamination devices.

4. Method according to claim 2, wherein said different pressures are obtained by having connecting environments at different pressures.

5. Method according claim 2, wherein secondary fluid stream is set by said micro-holes having different inlet and outlet cross sections.

6. A structural element which is to be subjected to the action of a fluid stream at an external surface thereof when in use, having at least one region provided with a microporous structure produced means of an electrolytic electroforming procedure in which there is a deposition of a metal or metal alloy on a matrix arranged at the cathode and having a hollow imprint suitable for creating conductive areas separated by insulating areas by filling with dielectric resins that constitute the electroformed holes, the microporous structure having an external surface that is smooth and devoid of roughness and crossed by micro-holes in correspondence with the insulating areas of the matrix, whereby a boundary layer control at the external surface of the structural element is obtained as a result of a secondary fluid stream flowing through said at least one region towards or away from said external surface; said microporous structure produced by the means of an electrolytic electroforming procedure being directly fabricated from a single deposition procedure of said metal or metal alloy on said matrix arranged at the cathode.

7. A structural element according to claim 6, comprising at least one blade element with said at least one region provided with a microporous structure.

8. A structural element according to claim 6, comprising at least one compressor stage of a turbo engine including said at least one region provided with a microporous structure.

9. A structural element according to claim 8, wherein said least one region comprises at least one insert applied to a stator or rotor blade of said compressor stage.

10. A structural element according to claim 6 which is a flap for the leading edge of an aircraft wing.

11. A structural element according to claim 6 which is a flap for the trailing edge of an aircraft wing said flap including porous element.

12. A structural assembly element according to claim 6, comprising at least an automotive rear wing assembly having at least one porous element.

13. A structural element according to claim 12, wherein said at least one region provided with a microporous structure of said structural element constitutes the entire body of the structural element.

14. A structural element according to claim 12, wherein said at least one region provided with a microporous structure of said structural element comprises at least one insert located at an edge location of said structural element.

15. A structural element according to claim 12, wherein said at least one region provided with a microporous structure of said structural engine is comprises an insert located on the border of an internal structure or strut of said structural element.

16. A structural element according to claim 12, wherein said at least one region provided with a microporous structure of said structural engine comprises at least one electroformed porous element applied to the structural element.

17. A structural element according to claim 16, wherein the said micro-holes of said microporous structure have the same diameter.

18. A structural element according to claim 16, wherein said micro-holes of said microporous structure have different diameters.

19. A structural element according to claim 18, wherein said micro-holes of said microporous structure have diameters in a range of 3–60 microns.

20. A structural element according to claim 19, wherein said micro-holes of said microporous structure have a polygonal or rhomboidal section.

21. A structural element according to claim 20, wherein said metal or metal alloy used in said electrolytic electroforming procedure for obtaining said microporous structure is selected from the group consisting of nickel, cobalt, alloys of nickel and cobalt, and titanium.

22. A structural element according to claim 21, wherein said micro-holes of said microporous structure have a form which is partly converging and partly diverging from said external surface to the internal surface of said structural element.

23. A structural element, in particular of a turbo engine, the structural element being subjected to the action of a fluid stream at an external surface thereof when in use, having at least one region provided with a microporous structure produced by means of an electrolytic electroforming procedure, wherein a deposition of a metal or metal alloy on a matrix arranged at the cathode and having a hollow imprint suitable for creating conductive areas separated by insulating areas by filing with dielectric resins that constitute the electroformed holes is produced, said microporous structure having an external surface that is smooth and devoid of roughness and being crossed by micro-holes in correspondence with the insulating areas of said matrix, wherein said microporous structure produced by the means of an electrolytic electroforming procedure is directly fabricated from a single deposition procedure of said metal or metal alloy on said matrix arranged at the cathode.

24. A structural element according to claim 23, wherein said micro-holes of said microporous structure have the same diameter.

25. A structural element according to claim 23, wherein said micro-holes of said microporous structure have different diameters.

26. A structural element according to claim 23, wherein said micro-holes of said microporous structure have diameters in a range from 3 to 60 microns.

27. A structural element according to claim 23, wherein said micro-holes of said microporous structure have a polygonal or rhomboidal section.

28. A structural element according to claim 23, wherein lamination devices for said secondary fluid stream are associated to said structural element.

29. A turbo engine comprising a structural element subjected to the action of a fluid stream at an external surface thereof when in use, such a structural element having at least one region provided with a microporous structure produced by means of an electrolytic electroforming procedure wherein the deposition of a metal or metal alloy on a matrix arranged at the cathode and having a hollow imprint suitable for creating conductive areas separated by insulating areas by filling with dielectric resins that constitute the electroformed holes, the microporous structure being crossed by micro-holes in correspondence with the insulating areas of the matrix, whereby a boundary layer control at the external surface of the structural element is obtained as a result of a secondary fluid stream flowing through said at least one region toward or away from said external surface; said microporous structure produced by the means of an electrolytic electroforming procedure being directly fabricated from a single deposition procedure of said metal or metal alloy on said matrix arranged at the cathode.

* * * * *